March 9, 1971  G. E. WEBB, JR  3,568,448
IGNITION SYSTEM FOR IGNITING A GAS GENERATOR BY THE USE OF
COMBUSTION GASES FROM A SOLID PROPELLANT ROCKET
MOTOR HAVING SELECTIVE ZONING CAPABILITIES
Filed April 1, 1969  3 Sheets-Sheet 1
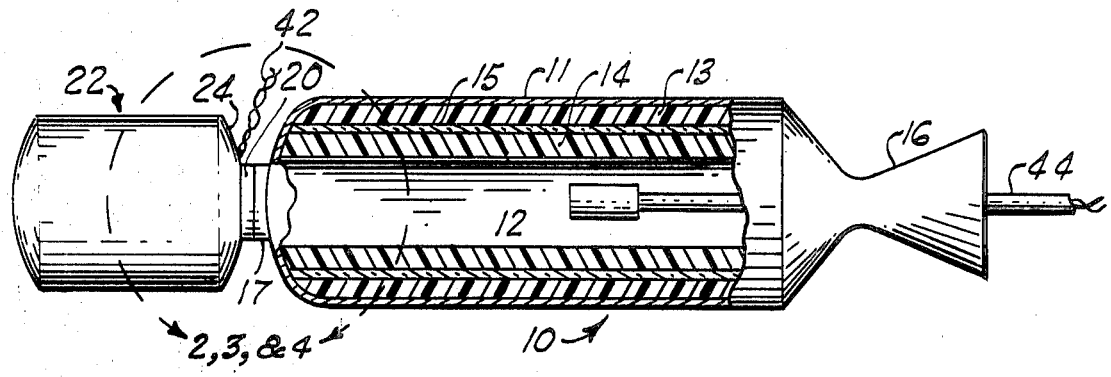
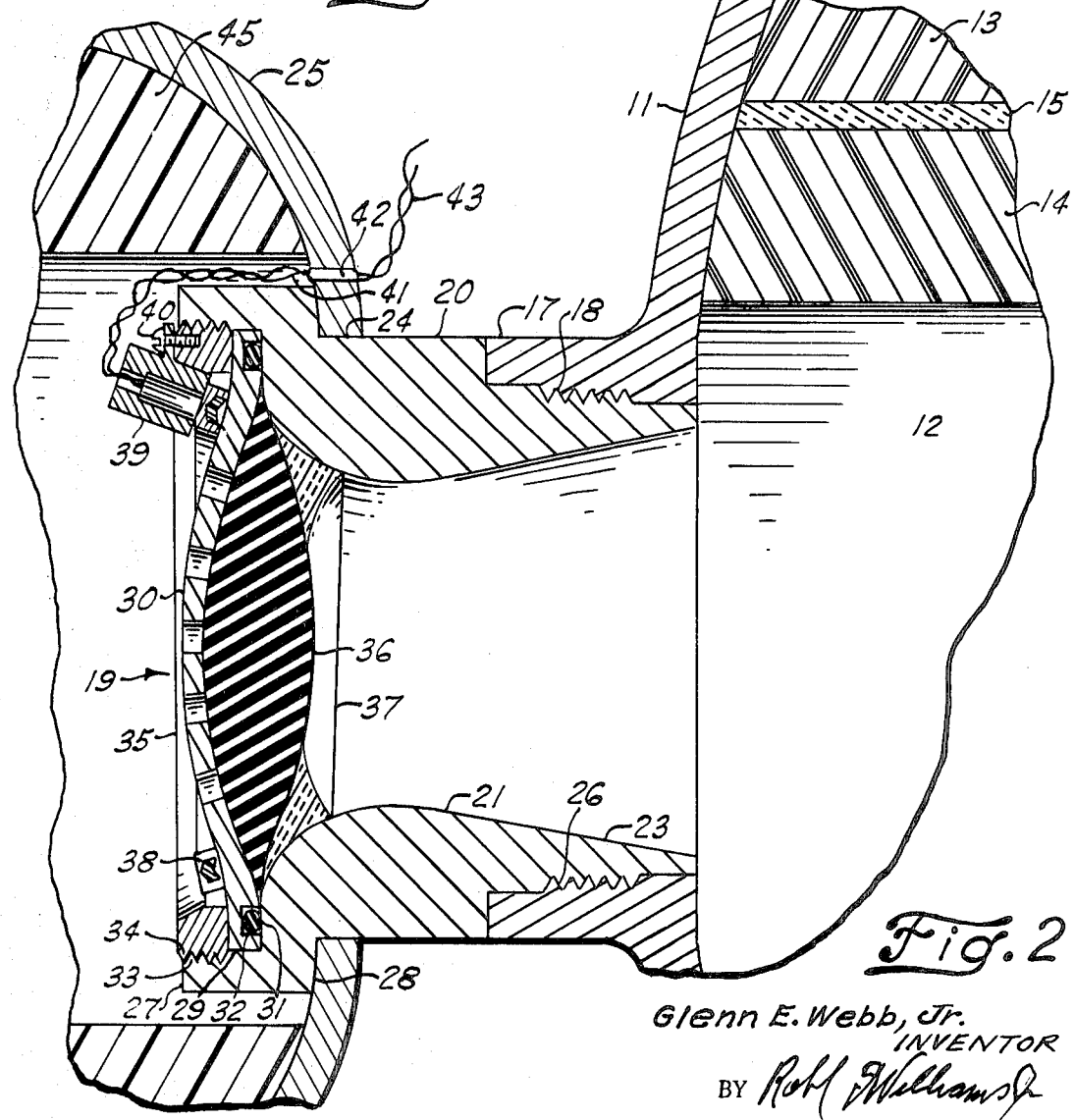
Glenn E. Webb, Jr.
INVENTOR
BY *Robt T Williams Jr*
ATTORNEY Glenn E. Webb, Jr.
INVENTOR

BY
ATTORNEY

United States Patent Office 3,568,448
Patented Mar. 9, 1971

3,568,448
IGNITION SYSTEM FOR IGNITING A GAS GENERATOR BY THE USE OF COMBUSTION GASES FROM A SOLID PROPELLANT ROCKET MOTOR HAVING SELECTIVE ZONING CAPABILITIES
Glenn E. Webb, Jr., Huntsville, Ala., assignor to Thiokol Chemical Corporation, Bristol, Pa.
Filed Apr. 1, 1969, Ser. No. 812,109
Int. Cl. F02k 9/04
U.S. Cl. 60—250                     2 Claims

ABSTRACT OF THE DISCLOSURE

An ignition system positioned between the combustion chamber of a gas generator having a solid propellant grain therein and the combustion chamber of a solid propellant rocket motor having selective zoning capabilities so that when the ignition system is operated the combustion gases from the combustion chamber of the solid propellant rocket motor will enter the combustion chamber in the gas generator and ignite the solid propellant grain therein.

BACKGROUND OF THE INVENTION (1) Field of the invention

It is a well-known fact that liquid rocket motors by the admission of a liquid fuel into the combustion chamber therein can be controlled so that during the flight thereof the presence of fluid in the combustion chamber of the liquid rocket motor will determine the thrust and operational flight of the liquid rocket motor. Solid propellant rocket motors, however, as is conventional, use only one medium of fuel and once it is ignited, the solid propellant rocket motor continues in flight without variation until the solid propellant grain, constituting the fuel, has been consumed.

However, in an effort to give a solid propellant rocket motor the same versatility possessed by a liquid rocket motor, a new construction designated as selective zoning was considered. In this form of a solid propellant rocket motor, several layers or zones of a solid propellant grain were positioned in the solid propellant rocket motor with a barrier of inert material separating the layers or zones of the solid propellant grain. Thus, when the first layer or zone of the solid propellant grain was ignited, the solid propellant rocket motor would "start" its flight, when the barrier of inert material was reached the thrust of the solid propellant rocket motor would drop and a period designated as "stop" would occur, then the inert barrier would be consumed and removed, either by a liquid injection system or some other form of ignition system, and the second layer or zone of the solid propellant rocket motor would again achieve thrust or "restart."

The ignition system embodying the instant invention is adaptable to be used with this type of solid propellant rocket motor and by being interposed between a gas generator and the solid propellant rocket motor and utilizing the combustion gases from the gas generator to reignite the second layer or zone of solid propellant grain, would replace the use of a liquid injection system.

(2) Description of the prior art

As previously stated, liquid injection systems were utilized in the "restart" step of a selective zoned solid propellant rocket motor and of course the development of such liquid injection system was and is time consuming, because the liquid injectants used had to operate at high temperatures without evaporating before the second layer or zone of the solid propellant grain could be reignited. Such a method of selective zoning had many drawbacks and the instant invention was achieved to overcome such drawbacks by utilizing the combustion gases from a gas generator to reignite the second layer or zone of the solid propellant grain in the solid propellant rocket motor.

SUMMARY OF THE INVENTION

This invention relates to improvements in ignition systems that are interposed between the combustion chamber of a gas generator and the combustion chamber of a solid propellant rocket motor having selective zoning capabilities so that combustion gases from the combustion chamber of the solid propellant rocket motor can enter the combustion chamber of the gas generator to ignite the gas generator to ignite an inert barrier in the solid propellant rocket motor.

The selective zoning concept of a solid propellant rocket motor is used to control the impulse of the solid propellant rocket motor by loading concentric layers or zones of a solid propellant grain that are separated by a barrier of inert material in the solid propellant rocket motor and then removing the inert barrier as desired. The instant invention, therefore, involves an ignition system that, when actuated, will permit the combustion gases from a gas generator to enter the combustion chamber of the solid propellant rocket motor, after the first layer or zone of the solid propellant grain in the solid propellant rocket motor has been consumed, to remove the inert barrier and permit reignition of the next layer or zone of the solid propellant grain in the solid propellant rocket motor.

It is an object of this invention, therefore, to provide an ignition system that will allow the combustion gases from a solid propellant rocket motor to enter the combustion chamber of a gas generator to ignite the gas generator so that the combustion gases therefrom will enter the combustion chamber of the solid propellant rocket motor and destroy a barrier of inert material in the solid propellant rocket motor and reignite a second layer or zone of solid propellant grain within the combustion chamber of the solid propellant rocket motor.

The use of the ignition system embodying the invention eliminates the need of a liquid injection system to destroy the inert barrier and also eliminates the need for a separate igniter for the gas generator, thus reducing the weight of the gas generator and also eliminating the usual overpressure caused by the extra addition of combustion gases from the gas generator into the combustion chamber of the solid propellant rocket motor, because of the ignition peak in the gas generator occasioned by the use of an additional igniting means.

With the above and other objects and advantages in view that may appear to one skilled in the art from reading the following description, it is to be understood that the invention consists of the more detailed mode of construction as illustrated in the accompanying drawings in which:

BRIEF DESCRIPTION OF THE DRAWINGS

FIG. 1 is an elevational view, partly in section, illustrating a solid propellant rocket motor having selective zoning capabilities with a gas generator connected thereto;

FIG. 2 is an enlarged fragmentary sectional view of one form of the ignition system embodying the invention that is located within the circle 2, 3 and 4 of FIG. 1;

DESCRIPTION OF THE PREFERRED EMBODIMENTS

Figure 3:
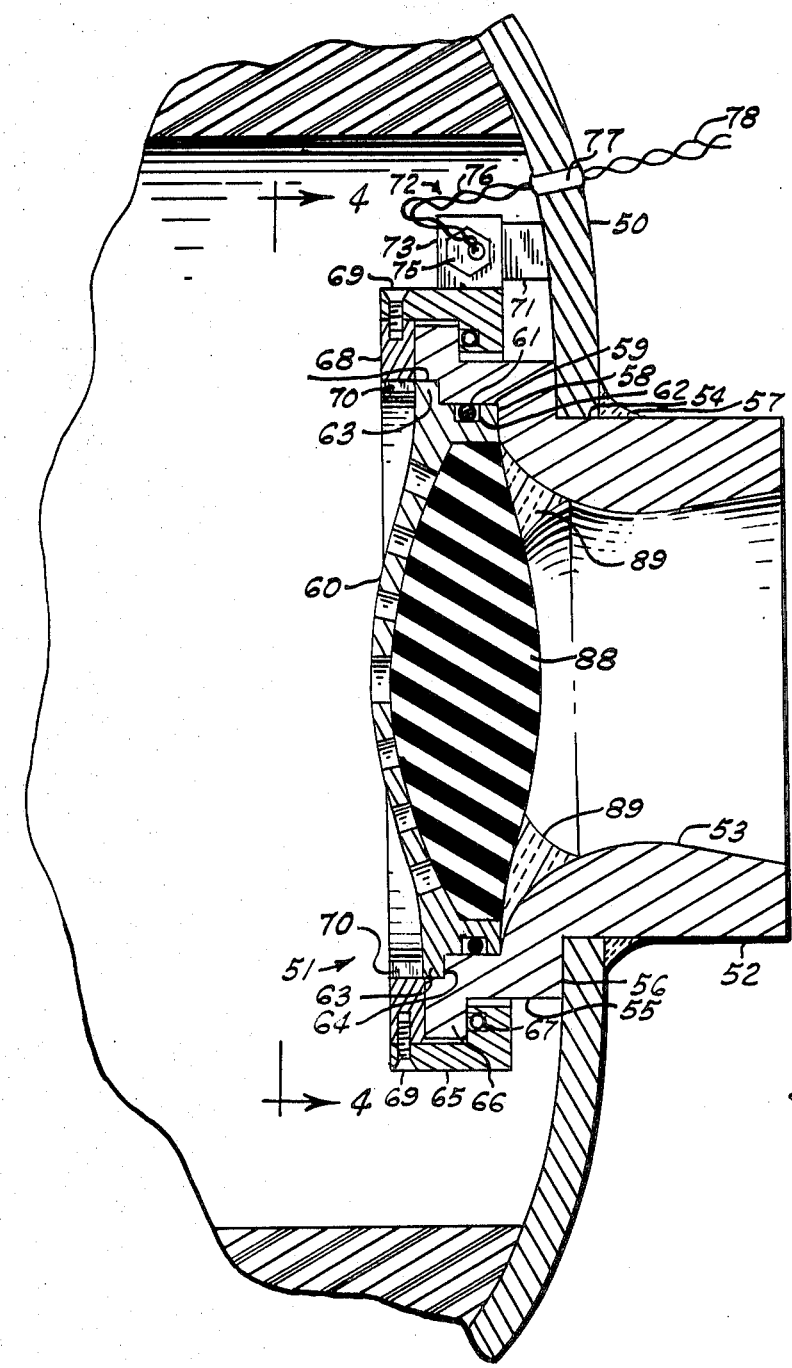
FIG. 3 is an enlarged fragmentary sectional view similar to FIG. 2 of another form of the ignition system embodying the invention.
Figure 4:
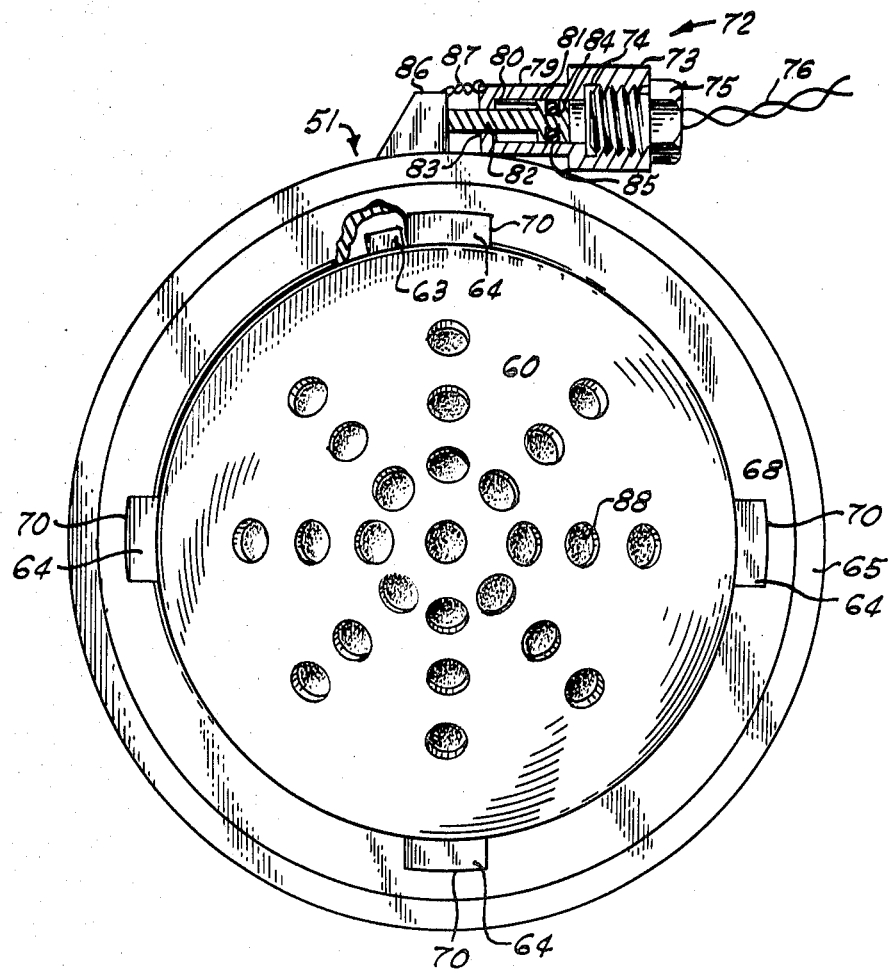
FIG. 4 is an enlarged elevational view, partly in section, on the line 4—4 of FIG. 3 and also in that area that is located within the circle 2, 3 and 4 of FIG. 1.

Referring more in detail to the drawings, wherein like parts are designated by like reference numerals, the reference numeral 10 is used to generally designate a solid propellant rocket motor having selective zoning capabilities.

The solid propellant rocket motor 10 includes a motor case 11 providing a combustion chamber 12 therein in which are loaded concentric layers or zones 13 and 14 of solid propellant grains that are separated by a barrier 15 of an inert material. A nozzle 16 is secured to the aft end of the motor case 11 for the exhaust of combustion gases created by the burning of the layers or zones 13 and 14 of solid propellant grains and the head end of the motor case 11 is provided with a tubular extension 17 that communicates with the combustion chamber 12 in the motor case 11 of the solid propellant rocket motor 10 and is provided with internal threads 18.

In this form of the invention, the ignition system 19 comprises a tubular body 20, the interior surface 21 of which is contoured so that the body 20 functions as a nozzle for a gas generator 22. The aft end of the body 20 has a reduced portion 23 which is inserted through a centrally located opening 24 in the removable dome-shaped aft end 25 of the gas generator 22 and then into the tubular extension 17 on the head end of the motor case 11 and threadably connected thereto by reason of the meshing of the external threads 26 thereon with the internal threads 18 in the extension 17.

The body 20 at the forward end thereof has an integral enlarged L-shaped flange 27 and a shoulder 28 defined by the flange 27 engages the inner surface of the aft end 25 of the gas generator 22 in circumjacent relation to the opening 24 and the flange 27 and the body 20 are secured to the aft end 25 of the gas generator 22 by any well-known method, such as welding or the like.

The flange 27 provides a seat 29 in which is positioned a forwardly curved perforated metal disc 30 and an O-ring 31 positioned in an annular groove 32 in the aft face of the disc 30 seals the disc 30 within the seat 29. Forwardly of the disc 30 the seat 29 is provided with internal threads 33 that mesh with and engage the external threads 34 on the peripheral edge of a retaining ring 35 that rigidly retains the disc 30 in the seat 29.

An ellipsoidal-shaped seal 36 made from an insulating material, such as silicone rubber or the like, is positioned in contactual relation with the aft face of the disc 30 to seal the perforations therein and a ring of an insulating putty 37, such as zinc chromate or the like is positioned about the peripheral aft surface of the seal 36 to retain the seal 36 in fixed contactual relation with the disc 30.

Positioned on the forward face of the disc 30 adjacent the peripheral edge thereof within the ring 35 is a ring-shaped explosive charge 38 of conventional structure and a conventional electrical actuated detonator 39, supported on the ring 35 by a fastener 40, engages the explosive charge 38 so that when an electrical impulse is fed to the detonator 39 by electric leads 41, the explosive charge 38 will be actuated. The leads 41 being connected to a disconnect 42 mounted in the aft end 25 of the gas generator 22 which in turn is connected to electric leads 43 that are extended to a guidance system, not shown, that is actuated by any well-known remote control system.

In the operation of this form of the invention, when a conventional igniter 44 is extended through the nozzle 16 into the combustion chamber 12 in the motor case 11, as shown in FIG. 1, and actuated, the layer or zone of solid propellant grain 14 will be ignited. When the layer or zone of solid propellant grain 14 has almost been completely consumed, either of two occurrences can happen, operation of the solid propellant rocket motor 10 can be terminated by allowing the consumption of the layer or zone of solid propellant 14 to finish without removal of the inert barrier 15 or the solid propellant rocket motor 10 can be operated for an additional period of time by removing the inert barrier 15 and allowing the layer or zone of solid propellant grain 13 under the inert barrier 15 to be ignited and if this procedure is to be followed, it is accomplished in the following manner.

This form of the invention is known as an explosive ignition system and when the layer or zone of solid propellant grain 14 has been nearly consumed and it is desired to operate the solid propellant rocket motor 10 further, the detonator 39 is activated by an electrical impulse flowing through leads 43 and 41 from the remotely controlled guidance system. The detonator 39, when activated, will initiate the explosive charge 38 which will cut the perforated disc 30 and permit the combustion gases from the combustion chamber 12 in the solid propellant rocket motor 10 to enter the gas generator 22 through the body 20 and ignite the solid propellant grain 45 therein.

Up to the time of the actuation of the detonator 39 the seal 36 has prevented the combustion gases from the combustion chamber 12 in the solid propellant rocket motor 10 from entering the gas generator 22, however, when the detonator 39 is actuated and the disc 30 has been cut, the combustion gases from the combustion chamber 12 in the solid propellant rocket motor 10 will push the remains of the disc 30, the seal 36 and putty 37 out of the nozzle 16 and the combustion gases from the combustion chamber 12 of the solid propellant rocket motor 10 will enter the gas generator 22. The solid propellant grain 45 therein will be ignited and the output of the combustion gases from the gas generator 22 will enter the combustion chamber 12 of the solid propellant rocket motor 10, consume and remove the inert barrier 15 and then ignite the second layer or zone 13 of solid propellant grain and thus maintain operation of the solid propellant rocket motor 10.

If the solid propellant rocket motor is of sufficient size, more than one gas generator may be utilized as required.

Since the same relationship exists between a solid propellant rocket motor and a gas generator, as previously described, only a fragmentary portion of a removable dome-shaped aft end 50 of a gas generator is shown and as shown, this form of the ignition system 51 also comprises a tubular body 52, the interior surface 53 of which is contoured so that the body 52 functions as a nozzle for the gas generator.

The aft end of the body 52 is inserted through a centrally located opening 54 in the removable dome-shaped aft end 50 to be connected to the head end of a motor case of a solid propellant rocket motor as previously described or the body 52 may be connected thereto in some other conventional well-known manner.

The body 52 at the forward open end thereof has an integral enlarged Z-shaped flange 55 and a shoulder 56 defined by the flange 5, engages the inner surface of the aft end 50 in circumjacent relation to the opening 54 and the flange 55 and body 52 are secured to the aft end 50 by any well-known method, such as by welding 57 or the like.

The inner surface of the flange 55 provides a seat 58 in which is positioned an annular flange 59 of a forwardly curved perforated metal disc 60 and an O-ring 61 positioned in an annular groove 62 in the peripheral edge of the flange 59, defining the seat 58, seals the flange 59 within the seat 58. The forward face of the disc 60 has a plurality of radially disposed peripheral projections 63 formed integrally therewith in a plane continguous with the surface of the forward face thereof, and the projections 63 are received in an annular seat 64 formed in the inner edge of the flange 55 forwardly of the seat 58 and contiguous therewith and of greater diameter than the diameter of the seat 58. An L-shaped circular member 65 is slipped over the aft end of the body 52 and the flange 55 before the body 52 is secured in position as in FIG. 3, and the member 65 engages the aft surface of the outer peripheral edge 66 of the flange 55, as shown in FIG. 3, and a ball race 67 provided in the contact surface of the member 65 with the edge 66 permits free rotation of the member 65 in relation to the edge 66 of the flange 55. A ring-shaped member 68 is secured within the member 65 by fasteners 69 so that the aft surface thereof engages the forward face of the flange 55, and the projections 63 on the disc 60. The internal surface of the ring-shaped member 68 is provided with a plurality of notches or cutouts 70 that will register with or be alined with the projections 63 during the operation of the ignition system 51, as will be later described.

Secured to the inner surface of the aft end 50 in superimposed relation to the member 65 by an integral projection 71 is a housing 72 that has an enlarged portion 73 in which is provided an internally threaded chamber 74 into which is threaded a gas pressure producing electric squib 75. Electrical leads 76 extending from the squib 75 are connected to a disconnect 77 mounted in the aft end 50 to which are connected electrical leads 78 that are connected to a conventional guidance system that is mounted on the solid propellant rocket motor or the air frame therefor. The housing 72 has a reduced portion 79 in which is provided a cylinder 80 in which there is mounted a piston 81, having an integral piston rod 82 thereon that extends through an opening 83 in the housing 72 outwardly thereof. The piston 81 is provided with an annular groove 84 in which is positioned an O-ring 85 which seals the piston 81 within the cylinder 80. An abutment 86 is rigidly secured to the periphery of the member 65 in axial alinement with the outer end of the piston rod 82 to be engaged thereby during the operation of the ignition means 51 as will be later described, it will also be noted that a frangible wire member 87 is connected at one end to the abutment 86 and at the opposite end to the reduced portion 79 of the housing 72 for a purpose to be later described.

An ellipsoidal-shaped seal 88 made from an insulating material, such as silicone rubber or the like, is positioned in contactual relation with the aft face of the disc 60 to seal the perforations therein and a ring of an insulating putty 89, such as zinc chromate or the like, is positioned about the peripheral aft surface of the seal 88 to retain the seal 88 in fixed contactual relation with the disc 60.

This form of the invention is known as a rotating ring release ignition system and as previously set forth, when the first layer or zone of solid propellant grain has been nearly consumed and it is desired to operate the solid propellant rocket motor further, the squib 75 is activated through the electrical leads 76 and 78 by an electrical impulse from the remotely controlled guidance system. The squib 75, when activated, will as is conventional produce pressure within the housing 72 to force the piston 81 forwardly whereby the piston rod 82 will engage the abutment 86 to rotate the member 65 and the ring 68 rotating simultaneously therewith, will cause the projections 63 on the disc 60 to be alined with the notches or cutouts 70 therein and the combustion gases in the solid propellant rocket motor will then blow the disc 60 into the gas generator, and the combustion gases from the solid propellant rocket motor will enter the gas generator and ignite the solid propellant grain therein. As the solid propellant grain in the gas generator is consumed, the combustion gases created thereby will enter the combustion chamber in the solid propellant rocket motor, consume and remove the inert barrier and ignite the second layer or zone of solid propellant grain. The frangible wire member 87 will prevent any rotation of the member 65 until it is broken when the piston rod 82 strikes the abutment 86 as previously described.

As previously stated, the seal 88 has prevented the combustion gases from the combustion chamber in the solid propellant rocket motor from entering the gas generator, however, when the member 65 is rotated and the disc 60 has been blown into the gas generator, the combustion gases from the solid propellant rocket motor will then enter the gas generator to ignite the solid propellant grain in the gas generator, all as previously described.

Both forms of the invention are based on the principle of permitting the combustion gases in a solid propellant rocket motor to enter a gas generator to ignite the solid propellant grain therein so that the combustion gases created thereby will enter the solid propellant rocket motor and consume and remove an inert barrier and ignite a second layer or zone of solid propellant grain within the solid propellant rocket motor.

Having thus described the invention what is claimed as new and desired to be secured by Letters Patent is:

1. An ignition system for a solid propellant rocket motor having two or more concentric layers of solid propellant grain therein separated by an inert barrier, and a gas generator connected to the head end of said solid propellant rocket motor, comprising a perforated disc interposed between said solid propellant rocket motor and said gas generator, means contacting said perforated disc for sealing the perforations therein, means retaining said perforated disc in position and a squib operated piston for moving said retaining means to disengage said retaining means so that said perforated disc will be removed to permit the combustion gases from the solid propellant rocket motor to enter and ignite the gas generator so that combustion gases therefrom will enter the solid propellant rocket motor to consume the inert barrier and ignite the next succeeding concentric layer of solid propellant grain.

2. An ignition system as in claim 1 wherein said retaining means comprises a rotatable ring having notches therein and projections on said perforated disc and said piston is adapted to rotate said ring to aline said notches with said projections for the removal of said perforated disc.

References Cited
UNITED STATES PATENTS

| | | | |
|---|---|---|---|
| 2,764,173 | 9/1965 | Renner | 220—89A |
| 2,766,904 | 10/1956 | Philip | 137—68 |
| 2,850,976 | 9/1958 | Seifert | 60—254 |
| 2,949,009 | 8/1960 | D'Ooge | 60—254 |
| 3,034,293 | 5/1962 | Ferris et al. | 60—250X |
| 3,172,255 | 3/1965 | Priapi | 60—250 |
| 3,340,691 | 9/1967 | Mangum | 60—250 |

DOUGLAS HART, Primary Examiner

U.S. Cl. X.R.
137—68; 220—89